(12) United States Patent
Karale et al.

(10) Patent No.: US 10,146,462 B2
(45) Date of Patent: *Dec. 4, 2018

(54) METHODS AND SYSTEMS FOR USING SERVICE LEVEL OBJECTIVES IN A NETWORKED STORAGE ENVIRONMENT

(71) Applicant: NETAPP, INC., Sunnyvale, CA (US)

(72) Inventors: Rajeev Veerabhadra Karale, Bangalore (IN); Chandan Kumar Bhuvanagiri, Bangalore (IN); Rajath Ranganath, Bangalore (IN); Bestin Jose, Bangalore (IN); Matthew Douglas Robinson, Sunnyvale, CA (US); Zacharia George, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/025,750

(22) Filed: Jul. 2, 2018

(65) Prior Publication Data

US 2018/0314445 A1 Nov. 1, 2018

Related U.S. Application Data

(63) Continuation of application No. 15/812,970, filed on Nov. 14, 2017, which is a continuation of application No. 14/863,202, filed on Sep. 23, 2015, now Pat. No. 9,846,545.

(51) Int. Cl.
G06F 3/06 (2006.01)

(52) U.S. Cl.
CPC ............ *G06F 3/0619* (2013.01); *G06F 3/065* (2013.01); *G06F 3/0605* (2013.01); *G06F 3/067* (2013.01)

(58) Field of Classification Search
CPC .... G06F 3/0605; G06F 3/067; G06F 11/1446; G06F 11/1448; G06F 11/1458; G06F 11/1461; G06F 11/2094; G06F 21/10; G06F 21/6218; G06F 3/0619; G06F 3/065;

(Continued)

(56) References Cited

U.S. PATENT DOCUMENTS

| 7,315,892 | B2 | 1/2008 | Freimuth et al. |
| 8,429,097 | B1 | 4/2013 | Sivasubramanian et al. |
| 9,798,891 | B2 | 10/2017 | Deulgaonkar et al. |

(Continued)

*Primary Examiner* — Zhuo H Li
(74) *Attorney, Agent, or Firm* — Klein, O'Neill & Singh, LLP

(57) ABSTRACT

Methods and systems for a networked storage environment are provided. One method includes using a storage service level (SSL) object and a protection service level (PSL) object for storing a plurality of configurable attributes by a processor. A combination of the configurable attributes define service level classes (SLCs) in a networked storage system using a plurality of resources. The SSL object and the PSL object use a same schema and naming convention for defining the plurality of configurable attributes regardless of configuration attribute type and resource type. The method also includes obtaining by the processor, attributes defining a second SLC for a storage volume assigned to a first SLC; and updating by the processor, a quality of service (QOS) policy for the storage volume for using a resource that meets attributes of the second SLC. The storage volume is assigned the resource to process requests for data.

20 Claims, 16 Drawing Sheets

(58) Field of Classification Search
CPC ..... G06F 8/20; G06F 8/34; G06F 8/38; G06F 9/544; G06F 3/0613
See application file for complete search history.

(56) References Cited

U.S. PATENT DOCUMENTS 9,846,545 B2 * 12/2017 Karale .................. G06F 3/0619
2006/0004868 A1    1/2006 Claudatos et al.

* cited by examiner

User Inputs

Action?*: Update SSL

Name*: Capacity

IOPS/TB Throttle*: 128

Initial IOPS Throttle*: 50

Thick/Thin?*: Thin-Type 2

Available Aggregates for mapping:

| Aggregate | Node | Cluster IP | Available Capacity(MB) | Total Capacity(MB) |
|---|---|---|---|---|
| kiran_e2e_aggr | fas806... | 10.225.40.40 | 173183 | 454659 |
| root_vol_aggr_vs_sri_fro... | fas806... | 10.225.40.40 | 438215 | 454659 |
| aggr_sri_from_api | fas806... | 10.225.40.40 | 707810 | 719877 |
| kiran_e2e_protaggr | fas806... | 10.225.40.40 | 448866 | 454659 |
| root_vol_aggr_vs_sri_fro... | fas806... | 10.225.40.40 | 452576 | 454659 |

Mapped Aggregates:

| Aggregate | Node | Cluster IP | Available Capacity(MB) | Total Capacity(MB) |
|---|---|---|---|---|
| aggr_pradeep | fas806... | 10.225.40.40 | 490014 | 606212 |

Comment:

Options

⊙ Execute now:

FIG. 2C

User Inputs

Action?*: Update PSL

Name*: Administrative

Primary Retention Policy*: 1wX1/1dx6/4hX6/1hX3

— Topology Details

Action?*: Update

Name: local_backup

Source?: primary

Destination Type?*: Backup

Destination's Storage Service Level*: Capacity

Recovery Point Object (in Hours):

Backup Retention Policy:

Comment:

Existing Topologies:

| Name | Topology Name | RPO (Hours) | Retention Count | Destination Type |
|---|---|---|---|---|
| Administrative | local_backup | 2-40.00 | 1wx2/1dx6/4hx6 | Backup |

Preview    Cancel

METHODS AND SYSTEMS FOR USING SERVICE LEVEL OBJECTIVES IN A NETWORKED STORAGE ENVIRONMENT

CROSS-REFERENCE TO RELATED APPLICATION

This patent application claims priority of and is a continuation of U.S. patent application Ser. No. 15/812,970, filed on Nov. 14, 2017, which claims priority of and is a continuation of U.S. patent application Ser. No. 14/863,202 filed on Sep. 23, 2015, now U.S. Pat. No. 9,846,545, issued Dec. 19, 2017, the disclosure of which are incorporated herein by reference in their entirety.

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to networked storage environments and in particular to managing service level objectives for such environments.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Clients or users are provided management tools to interface with storage systems. It is desirable to provide tools to users where a user can define a service level capability for storing and protecting data and the management tool can automatically configure the service level capability and resources for providing the storage service.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 2C shows an example of a screenshot for the process of FIG. 2C;

FIG. 2E shows an example of a screenshot for the process of FIG. 2D;

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. For example, one method includes storing a plurality of configurable attributes at a data structure by a processor, where a combination of the configurable attributes is used to define a custom service level class (SLC) in a networked storage environments using a plurality of resources for storing data; receiving a request by the processor to create the custom SLC based of a set of configurable attributes; identifying a resource of the networked storage environment that meets the requirements defined by the attributes of the custom SLC; and configuring the resource for meeting the requirements of the custom SLC.

Figure 1A:
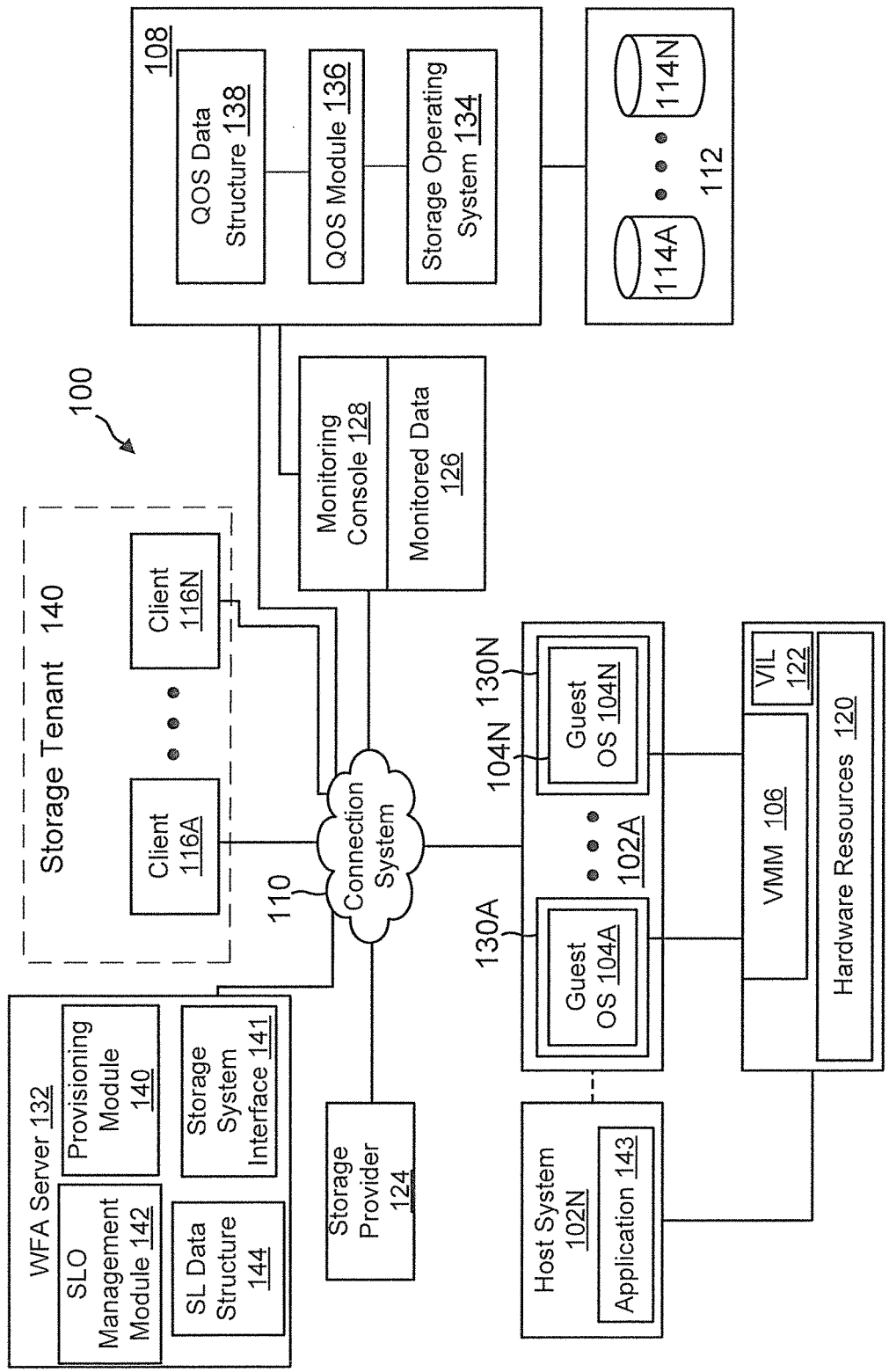
FIG. 1A shows an example of an operating environment for the various aspects disclosed herein.

System 100:

FIG. 1A shows an example of a networked storage environment 100 (also referred to as system 100), where the adaptive aspects disclosed herein may be implemented. In one aspect, system 100 may include a plurality of computing devices 102A-102N (may also be referred to individually as a host platform/system 102 or simply as server 102) communicably coupled to a storage system 108 executing a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A executes a plurality of virtual machines (VMs) in virtual environment that is described below in detail. Host 102N may execute one or more application 143, for example, a database application, an email application and other. The VMs and applications may be used to read and write data at the storage devices of the storage system 108.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage and protection levels through the storage provider. For example, a storage provider may set limits to storage space, throughput and latency for a client. It is noteworthy that the adaptive aspects of the present disclosure are not limited to using a storage provider or a storage tenant.

System 100 includes a management console also referred to and shown as a workflow automation (WFA) server 132 that enables clients to automate numerous tasks involving storage services provided by the storage system 108 and described below in detail. In one aspect, WFA server 132 executes or includes a service level objective (SLO) management module 142 (may be referred to as module 142) and a SLO based, provisioning module 140 (may be referred to as module 140) for providing user defined storage service levels and protection service levels.

The term SLO as used herein provides a quantitative measure for describing and comparing capabilities of storage systems and the services of the storage system using certain attributes. SLOs are relevant to a user who may not be aware of the underlying storage technology used for meeting the SLO. The SLO may be defined by a service level class (SLC) associated with certain attributes. In one aspect, a SLC is a defined service level that is described or stored at a service catalog or a data structure expressed as a set of SLO attributes. The service catalog is used to list the SLCs and accessible by a query operation. The service catalog also maps storage pools, each having a plurality of storage devices, where each class of storage is available with physical access parameters such as Internet Protocol (IP) address of storage servers, storage capacities etc.

A SLC may have both a storage service level (SSL) and a protection service level (PSL). SSL identifies a certain performance level defined by a storage device type, number of input/output operations executed per second (IOPS) for certain amount of storage (for example, a terabyte ("TB")), a minimum number or IOPS, an aggregate type and others. Storage service level may also include other features, for example, thick or thin provisioning, compression, deduplication and other features. In thick provisioning, provisioned storage space is the same or more than what a user is provided. In thin provisioning, actual storage space is allocated based on use, thus a user may be provided 500 MB and only 300 MB may be allocated for use. As the user uses storage, more space is allocated.

PSL is provided to protect user data by using backup and/or disaster recovery. Backups are kept at a different location than the source data within the same storage system. For disaster recovery, a remote storage system is used to replicate user data. Backups may be based on using snapshot technology for creating a point in time copy of a volume or a LUN (logical unit number), while disaster recovery uses mirroring technology to mirror the user data at the remote location, as user data changes. As an example, PSL may be defined by recovery point objective (RPO) to recover a database, or backups, a recovery time objective (RTO) for disaster recovery using the remote location and other parameters.

In one aspect, a SL data structure 144 (may be referred to as data structure 144 or service catalog) is used for enabling the various processes described herein. It is noteworthy that although data structure 144 is shown as a single block, it may include one or more sub-structures that are described below in detail.

In one aspect, WFA server 132 executes or interfaces with a storage system interface 141 (also referred to as interface 141). The interface 141 may be implemented as kitchen police (KP) daemon that can be used to update data structure 144 or a portion thereof. In one aspect, interface 141 updates a QoS policy data structure for associating certain performance metrics for a service level. It is noteworthy that interface 141 may be based on other formats and is not limited to a KP daemon.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or LUNs) that presents storage space to the storage provider 124, clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2A.

System 100 may also include a monitoring console 128 that interfaces with the storage operating system 134 for sending and receiving performance data that may also be referred to as QoS data. QOS at the storage system level may be implemented by a QOS module 136 that maintains one or more QOS data structure (or performance data structure) 138. QOS module 136 is used to implement a guaranteed latency and/or a throughput rate for processing I/O requests, as associated with service levels.

The term guaranteed latency as used herein means that a VM or client is guaranteed that an I/O request will be processed within certain duration. The term guaranteed throughput as used herein means a guaranteed number of IOPS that are processed for a client. Throughput may be expressed as an absolute value or as a percentile metric (for example, a certain percentage of the total number of requests).

QOS module 136 stores QOS data at data structure 138. The data structure 138 identifies each storage volume and the associated latency and throughput. QOS module 136 provides this information to the storage operating system 134 such that storage operating system 134 can prioritize and process I/O requests based on the latency and throughput rates associated with the storage volumes. The storage operating system 134 maintains a plurality of queues (not shown) for providing QOS for each storage volume. The monitoring console 128 obtains QOS data from storage operating system 134 and stores it at a data structure 126. The monitored data 126 may be used to monitor compliance to service levels.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 143 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail.

Figure 1B:
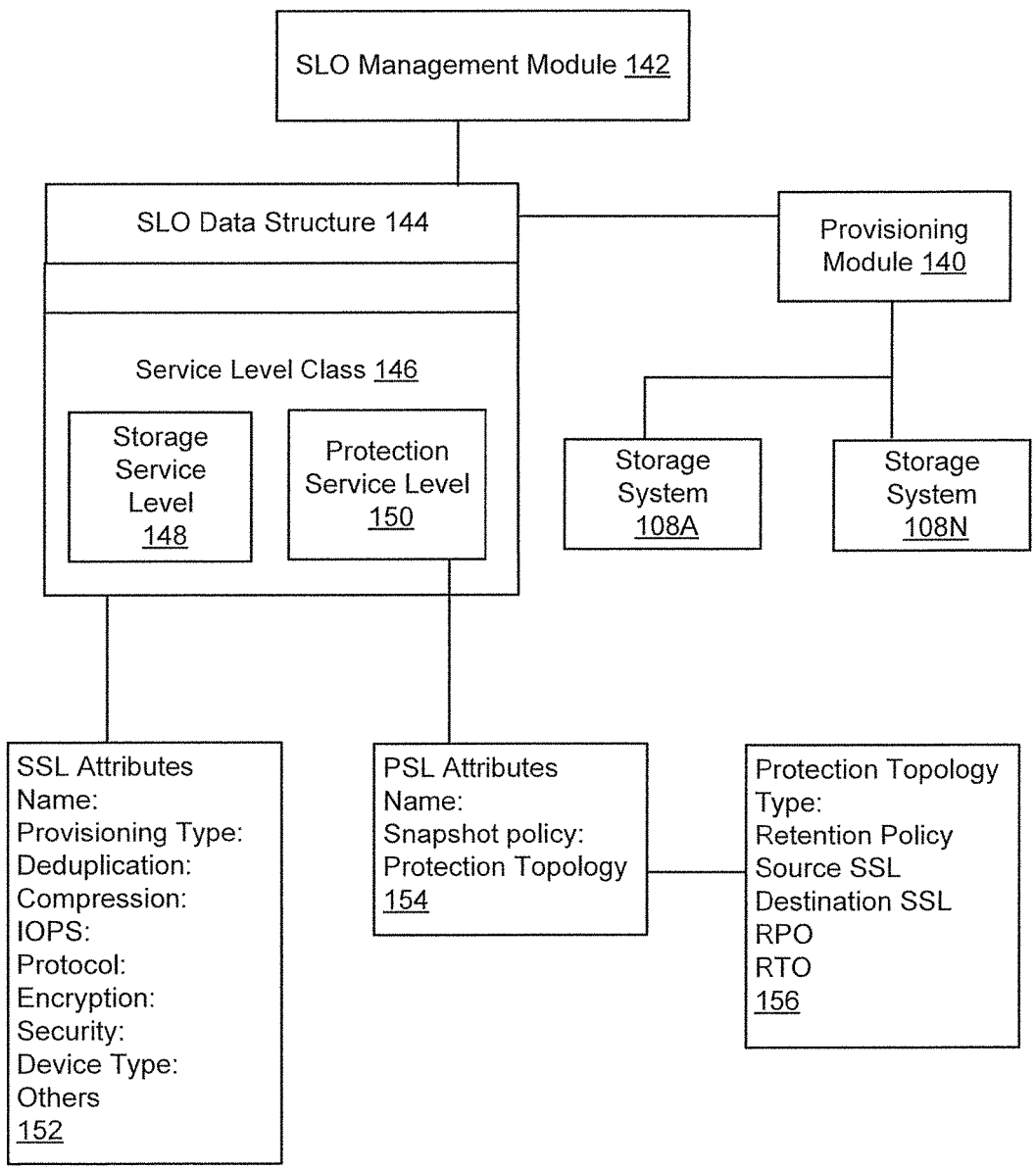
FIG. 1B shows an example of a data structure format, according to one aspect of the present disclosure.

SLO Data Structure 144:

FIG. 1B shows an example of a format for data structure 144. In one aspect, data structure 144 includes one or more SLCs 146. Each SLC may be defined by a storage service level (SSL) object 148 and a protection service level object (PSL) 150, each having certain features. SSL object 148 may store various attributes/features 152, for example, a name, provisioning type (i.e. thick or thin provisioning), deduplication, device type, number of IOPS/TB, minimum number of IOPS, a protocol that is used by the storage system (for example, Fibre Channel, iSCSI and others), encryption for storing data, security features and others. It is noteworthy that the attributes mentioned herein as an example are configurable and the adaptive aspects of the present disclosure may be implemented with more or fewer attributes.

The PSL object 150 stores attributes 154, for example, a name, a snapshot policy that defines how snapshots are taken and a protection topology. The protection topology is defined by object 156 that defines the protection type, a retention policy, a source storage service level class, destination service level class, RPO and others.

In one aspect, data structure 144 is created by using the SLO management module 142 and then used by the SLO based provisioning module 140 for finding an appropriate storage resource from storage system 108A-108N (similar to storage system 108).

Figure 1C:
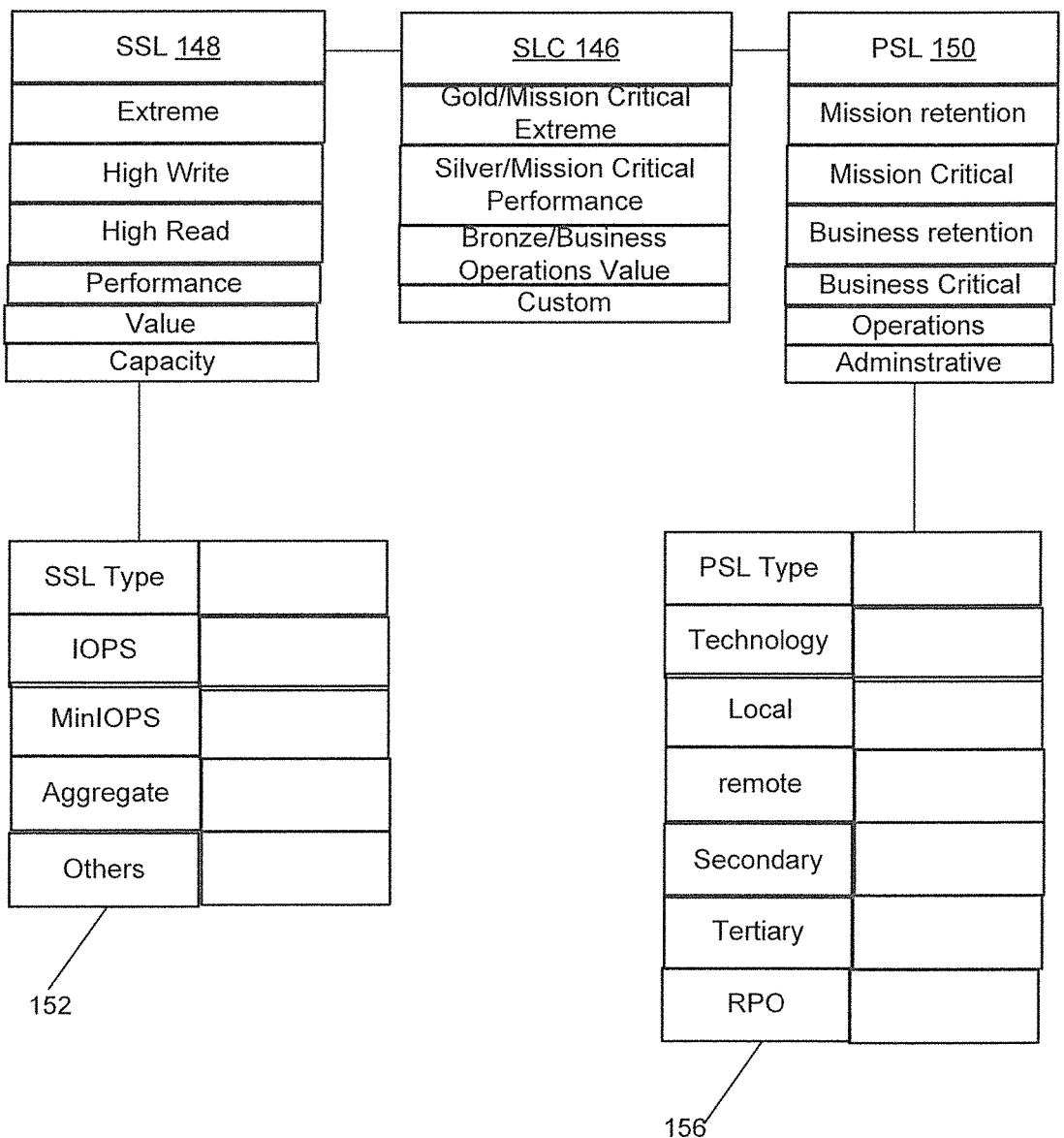
FIG. 1C shows another example of the data structure format, according to one aspect of the present disclosure.

FIG. 1C shows an example of SLC 146. For example, a SLC may be defined as Gold/mission critical, Silver/Business Critical performance, bronze/business operations value, custom or customized that is user defined. PSL 150 defines various protection levels and SSL 148 defines different storage service levels. The attributes 152 and 156 are self-explanatory.

In one aspect, the SLC 146 may be defined using a configuration file based on Extensible Markup language (XML). For example:

```
<Services version="[version]">
    <Service platform="[platform name]" name="[service name]"
        version="[version]">
            <Attributes>
    </Service>
</Services>
```

It is noteworthy that the adaptive aspects of the present disclosure are not limited to the XML format. Other object data formats, for example, JSON or any other format may be used. JSON means Javascript Object Notation that uses a text format and is platform independent. JSON is built on a collection of name/value pairs and an ordered list of variables. An object in JSON is an unordered set of name/value pairs. An object begins with a { (left brace) and ends with} (a right brace). Each name is followed by: (colon) and the name/value pairs are separated by, (comma). An array is an ordered collection of values. An array begins with [ (left bracket) and ends with] (right bracket). Values are separated by "," (comma). A value can be a string in double quotes, or a number, or true or false or null, or an object or an array. A string is a sequence of zero or more Unicode characters, wrapped in double quotes, using backslash escapes. A character is represented as a single character string.

As shown above, storage (or protection) service is defined by a "Service" definition with individual attributes. The service is associated with a platform name, service name and version. The platform name identifies a storage system type, while the service name identifies the storage service for the platform. In one aspect, to define an attribute in the foregoing XML schema, a naming convention is provided for new objects. System limits are used for finding the right location to place resources and established polices are used for provisioning, as described below in detail. In one aspect, a schema construct of attributes are used to define a SLC which can be used to automate storage service management tasks, as described below in detail with respect to the various process flows.

In one aspect, the various service level attributes are defined for different storage platforms i.e. storage system types. The storage system types may vary based on the storage device type as well as storage device capabilities. The following provides a brief description of various attribute that can be used to define SLCs, for a first storage system type, for example, the FAS series storage servers provided by NetApp Inc. (without derogation of any trademark rights)

| Attribute Name | Type | Description |
| --- | --- | --- |
| AggrMaxQoSPolicyGroupValue | Number | Maximum number of IOPS allocated on any given aggregate for a storage service. |
| AggrSearchPattern | String | The search pattern to use or search for aggregates. |
| AggrUsedSpaceThreshold | Number | Identifies the amount of used space allowed in a given aggregate for it to be identified as a candidate for use. |
| ClusterSearchPattern | String | The search pattern to search for clusters. |
| ExportPolicyName | String | The name of an export policy to use as the default for a storage service. |
| QoSModel | String | Identifies the QoS model type: Standard This option represents using a static QoS type and value. QoSPolicyGroupType represents the type to use, and QoSPolicyGroupValue represents the value of the type. IOPSPERGB This option represents using a dynamic QoS model. QoSIOpsPerGBRatio represents the ratio of IOPS to provide for each allocated gigabyte. QoSMinIOpsPerGB and QoSMaxIOpsPerGB represent the minimum and maximum number of IOPS assigned during initial provisioning. |
| QoSMinIOpsPerGB | Number | The minimum number of IOPS for a storage service when using the IOPSPERGB QoS model. |
| QoSMaxIOpsPerGB | Number | The maximum number of IOPS for a storage service when using the IOPSPERGB QoS model. |

| Attribute Name | Type | Description |
| --- | --- | --- |
| QoSIOpsPerGBRatio | Number | The ratio of the number of IOPS assigned per gigabyte of allocated storage. The value is multiplied by the number of gigabytes requested in order to calculate the IOPS. |
| QoSPolicyGroupNamePrefix | String | The name prefix to assign to the QoS policy group created with each new storage service. For example, qos_ssp_may be the string to use as a baseline for a storage service. |
| QoSPolicyGroupType | String | IOPS indicates using IOPS for the QoS policy group. MB/s indicates using Megabytes per second for the QoS policy group. |
| QoSPolicyGroupValue | Number | The number of IOPS or MB/s to limit the QoS policy group. |
| SnapshotPolicyName | String | The name of a Snapshot ® policy to use as the default for a storage service. |
| SnapshotReservedPercent | Number | The amount of space reserved for Snapshot copies associated to a newly created storage service volume. |
| VolumeSpaceGuaranteeValue | String | Thin provisioning values:<br>None: This option indicates that space will only be allocated from an aggregate as it is used in the storage service volume.<br>File: This option indicates that space used for reserved LUNs or files in the storage service volume will be allocated from the aggregate.<br>Volume: This option indicates that the total space of the storage service volume should be allocated up front, regardless of whether space is used for data or not. |
| VolumeDedupeValue | String | Enables deduplication:<br>True: This option turns on deduplication on the storage service volume.<br>False: This option turns off deduplication on the storage service volume. |
| VolumeCompressionValue | String | Used to enable or disable compression<br>Disabled: This option turns off compression on the storage service volume.<br>Background: Data is compressed based on deduplication schedule.<br>Inline: Data sent for storage service compressed in memory before committed to a mass storage device. |
| SVMSearchPattern | String | The search pattern is used to search for storage virtual machines (SVMs). |
| VolumeNamePrefix | String | This defines a name prefix to assign to the volume created with each new storage service. For example, vol_ssp_might be the string to use as a baseline for a storage service. |
| SnapMirrorScheduleName | String | The name of the SnapMirror ® schedule to use for replication. SnapMirror is replication technology provided by the assignee of this application and used for mirroring data at a remote location. |
| SnapMirrorPolicyName | String | The name of the SnapMirror policy to use for replication. |

Figure 1D:
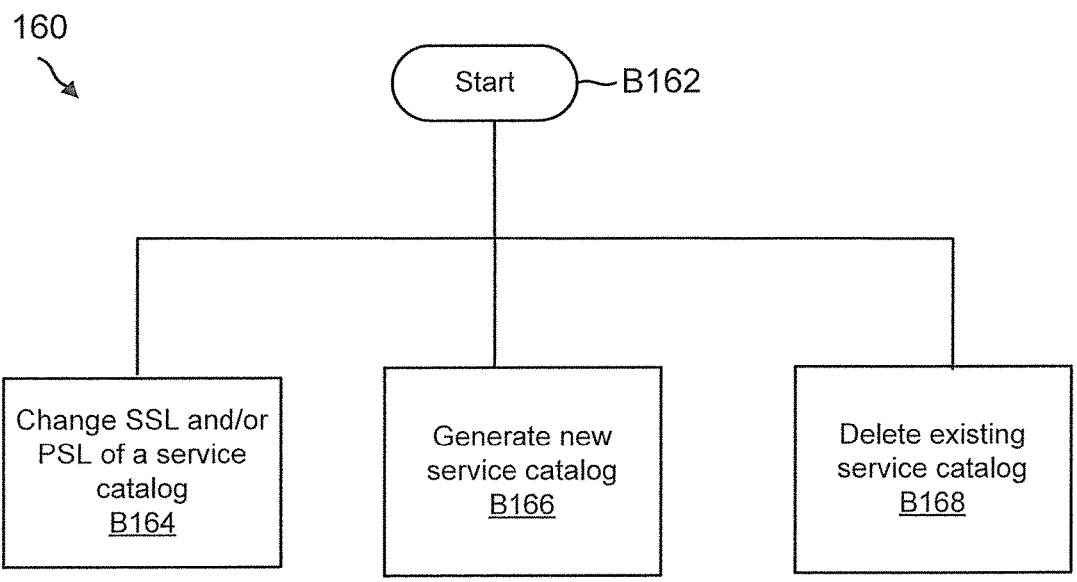
FIG. 1D shows an example of a process for generating a service catalog with one or more service levels, according to one aspect of the present disclosure.
Figure 1E:
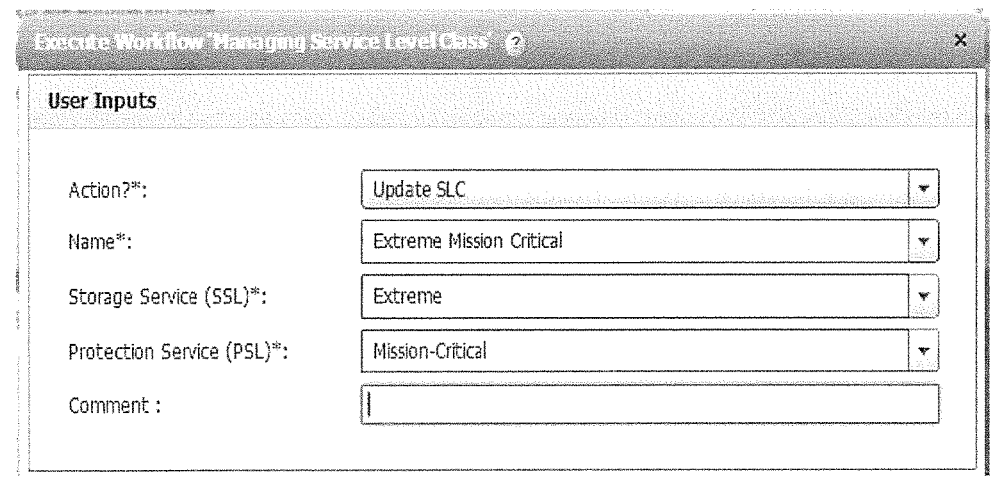
FIG. 1E shows an example of an input screen for creating a service catalog, according to one aspect of the present disclosure.

FIG. 1D shows a process 160 for managing a service catalog with one or more SLCs, according to one aspect of the present disclosure. The process blocks may be executed by WFA server 132 in general and SLO management module 142, in particular. The process begins in block B162, where a user provides an input via an interface that is presented to the user by the WFA server 132. An example of an input is shown in FIG. 1E as a screenshot 170. The screen shot 170 shows that the user may elect an action type, for example, update (shown), "add" or delete (not shown). The user provides a name for the SLC and defines the class for the SSL and PSL.

For the update option, in block B164, a SSL or PSL are changed and the service catalog is saved. To generate a new service catalog, a SLC is created and then saved at a storage location, in block B166. An existing service catalog may be deleted in block B168.

Before describing other processes of the current disclosure, the following provides a brief description of a clustered storage system.

Figure 2A:
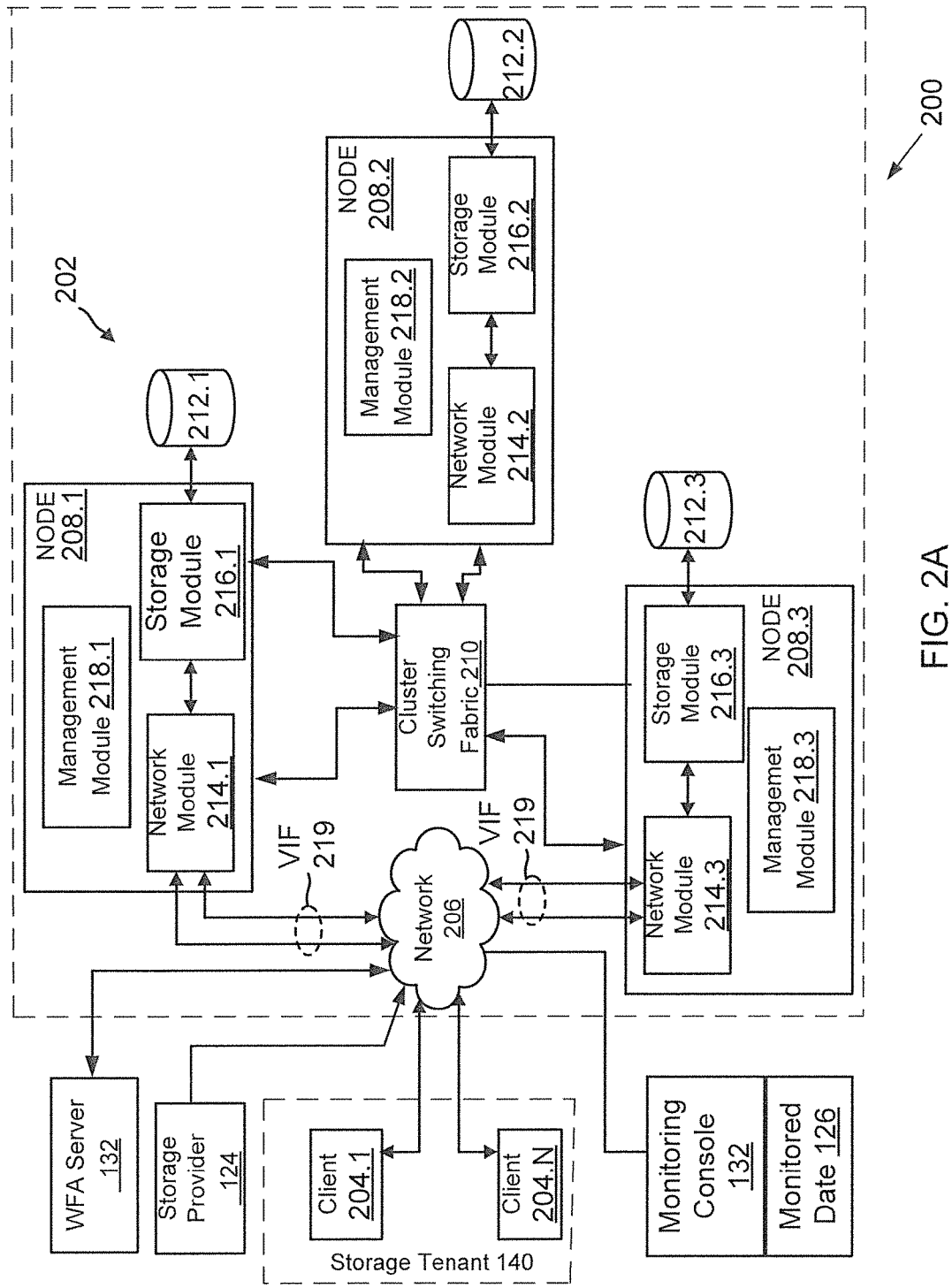
FIG. 2A shows an example of a clustered storage system, used according to one aspect of the present disclosure.

Clustered System:

FIG. 2A shows a cluster based, networked storage environment 200 having a plurality of nodes that store data on behalf of clients. System 200 includes the WFA server 132, the storage provider 124, the storage tenant 140 and the monitoring console 128 that have been described above in detail Storage environment 200 may include a plurality of client systems 204.1-204.N as part of or associated with storage tenant 140, a clustered storage system 202 (similar to storage system 108) and at least a network 206 communicably connecting the client systems 204.1-204.N, the WFA server 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N (or the WFA server 132, storage provider 124 and the monitoring console 128) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128. The management modules may also be used to configure QOS values (e.g. latency and throughput) for storage volumes that are managed by a node.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
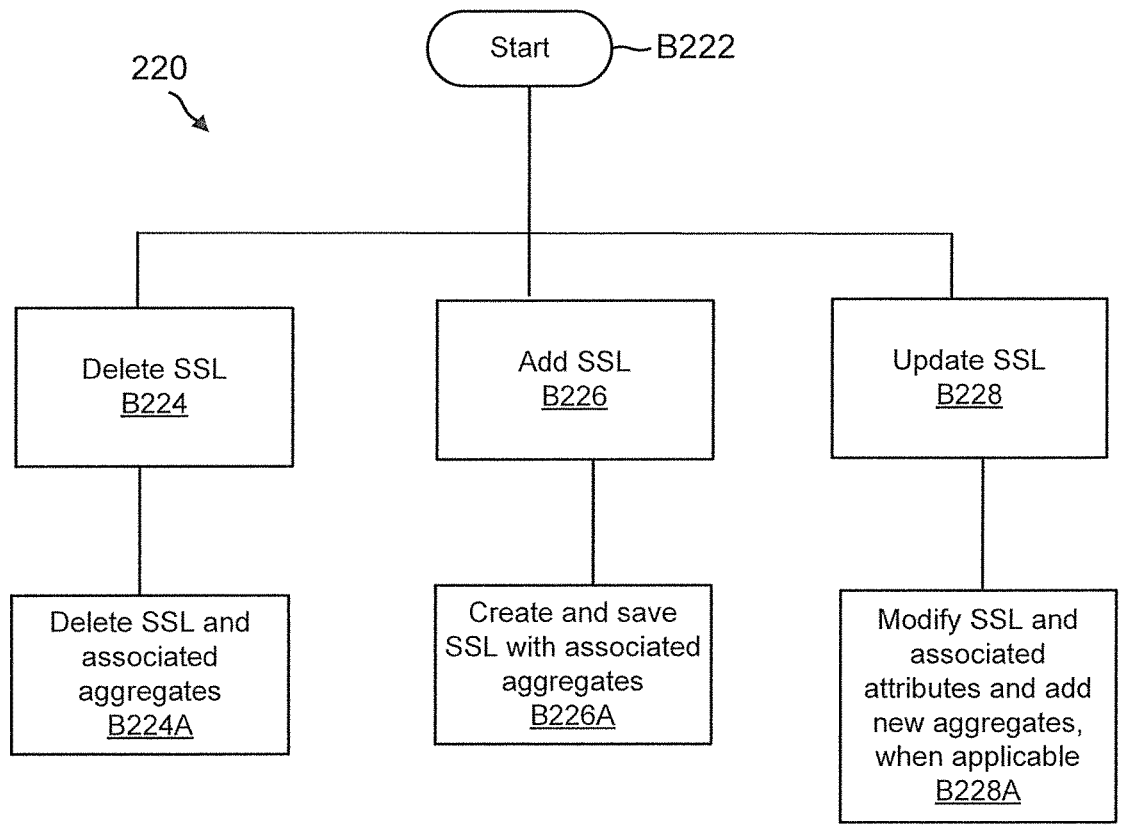
FIG. 2B shows a process flow diagram for managing storage service levels, according to one aspect of the present disclosure.

SSL Process Flow:

FIG. 2B shows a process 220 for modifying, deleting or adding a new storage service level. This allows a storage environment designer to define performance service attributes. The process begins in block B222, when a graphical user interface (GUI) or a command line interface (CLI) is presented by WFA server 132 (or any other entity) on a display device. A user then selects a particular action, for example, to delete (B224), add (B226) or update (B228) a SSL. To delete the SSL, in block B224A, the process deletes a SSL and removes the SSL from a QoS policy data structure that may be part of data structure 144.

In another aspect, a user may select a remove option (not shown), where an aggregate is removed from one SSL and is made available for use with another SSL.

To add a SSL in block B226A, the SLO management module 142 obtains the attributes for the new SSL. The attributes may include IOPS/TB, minimum IOPS, provisioning features and others, as shown in FIG. 1C. The aggregates that can meet the SSL are identified and mapping of the aggregates with the SSL is stored. In one aspect, when the storage system interface 141 maintains a QOS policy data structure as part of a configuration data structure, then the data structure is updated with the aggregate information.

To update a SSL, in block B228A, the SSL is modified by modifying the SSL attributes, for example, IOPS value and new aggregates that can support the modified SSL are added.

FIG. 2C shows an example of a GUI 230 where a user can select the option to delete, add or update a SSL. The example of FIG. 2C shows the update operation. The name associated with the SSL is "Capacity". The number of IOPS per TB is shown as 128, while an initial IOPS value is shown as 50. The provisioning type is shown as thin. The aggregates that can be mapped to the SSL are shown in segment 230A, while aggregates already mapped are shown in segment 230B. As shown in FIG. 2C, the systems and processes described herein provide an intuitive tool to a user for managing SSL based on user needs.

Figure 2D:
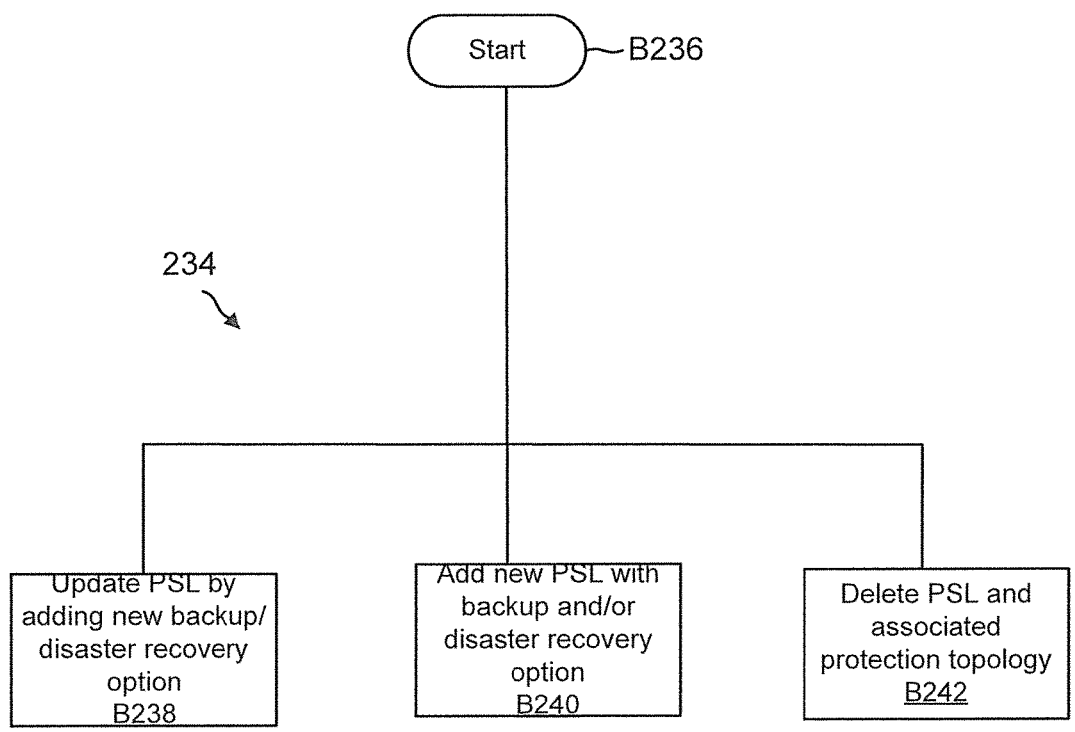
FIG. 2D shows a flow diagram for managing protection service levels, according to one aspect of the present disclosure.

Managing PSL:

FIG. 2D shows process 234 for adding, updating or deleting a PSL, according to one aspect. The process blocks may be implemented by receiving user input via a GUI 244, as shown in FIG. 2E, described below. The process begins in block B236, when a user is presented with the option for providing an input in segment 246A of GUI 244. Segment 246A provides the user to select the option to update a PSL, add a PSL or delete one.

In block B238, the user selects the update option from segment 246A of the GUI 244 described above with respect to FIG. 2E. The topology details are obtained from data structure 144 by the SLO management module 142. Segment 246B of FIG. 2E shows the topology details. For example, the topology details identify the action type, the PSL name, whether a backup is from a primary or secondary source and a destination type. Segment 246B also identifies a destination SSL, recovery point objective (RPO), a backup retention policy that identifies how long a backup is to be kept.

To add a new backup level for an existing PSL in block B238, the user selects the "add" option in segment 246B. The user selects a primary or secondary source, selects "backup" or "disaster" for the destination and selects a destination SSL for the destination volume. The RPO for the backup level and the policy for the backup level are obtained. For disaster level, a new recovery time objective (RTO) is selected instead. This creates a new "edge" or link to the PSL.

To update an existing link for the PSL, the user selects the update option and then selects the update option in segment 246B. The link name is then selected, and based on the link type, the appropriate action is taken.

In block B240, the user may elect to add a new PSL using GUI 244, according to one aspect. To add the PSL, a link is established with a primary volume. A name is assigned to the link. A source is selected for the edge or link i.e. primary or secondary source. The destination type is then selected as either backup or disaster. For backup, a retention policy is also assigned. The RPO level is also assigned to the link. To add a backup or a disaster level protection, the process is the same as described above with respect to block B238. It is noteworthy that data structure 144 stores the information regarding snapshot policies and disaster configuration information. If the information is not available at data structure 144, then the information may be obtained from the appropriate storage system by the storage system interface 141.

To delete a PSL, the user selects the delete option from segment 246A in block B242. All topologies for the protection level is deleted from data structure 144.

Figure 2F:
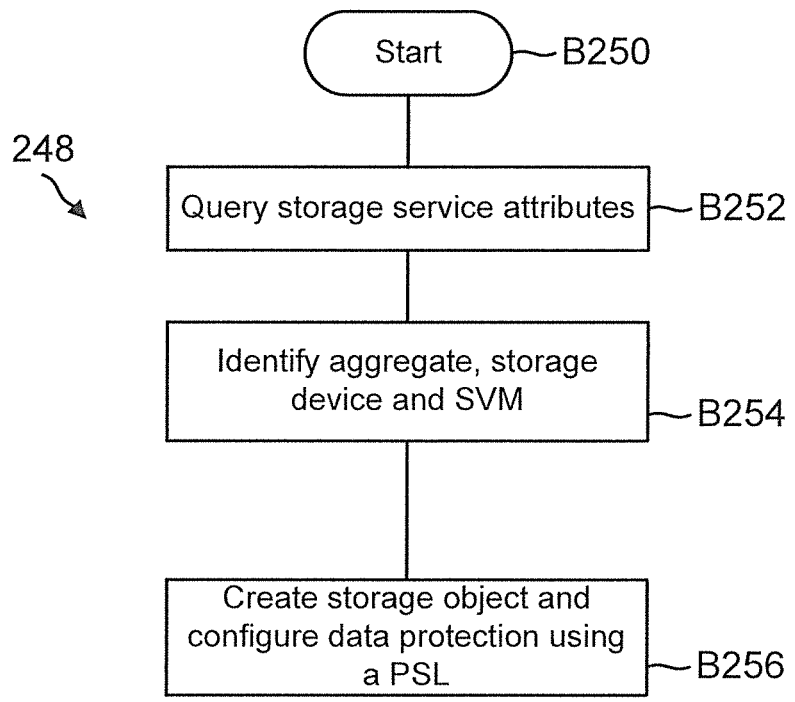
FIG. 2F shows a process for creating a storage object based on service level attributes, according to one aspect of the present disclosure.

Provisioning SLCs:

FIG. 2F shows a high level process flow 248 for creating a SSL and PSL, according to one aspect of the disclosure. The process begins in block B250. The process steps may be executed by the SLO management module 142 based on user inputs received via GUIs of FIGS. 2C and 2E described above in detail. In block B252, storage service attributes may be queried. As described above, the attributes related to storage services are maintained in a schema (for example, an XML schema) based on a service name at data structure 144. Once the attributes are obtained or defined for the service level, in block B254, the aggregates, cluster and SVMs associated with the service level are identified. This may be performed by obtaining aggregate, cluster and SVM information from the storage system or this information may already be stored at data structure 144. In one aspect, a cluster search pattern, a SVM search pattern and an aggregate search pattern is used for obtaining this information. The QoS limits (for example, IOPS/TB, minimum IOPS and others) for the volumes are evaluated with the storage capacity for provisioning.

In block B256, a storage object associated with the service level is created. The storage object is associated with a QoS policy group and a storage volume. The protection service level may also be created for both backup and/or disaster protection is setup. For disaster recovery, peer cluster/SVM relationships are also created. Thereafter, the storage service class is created.

Figure 2G:
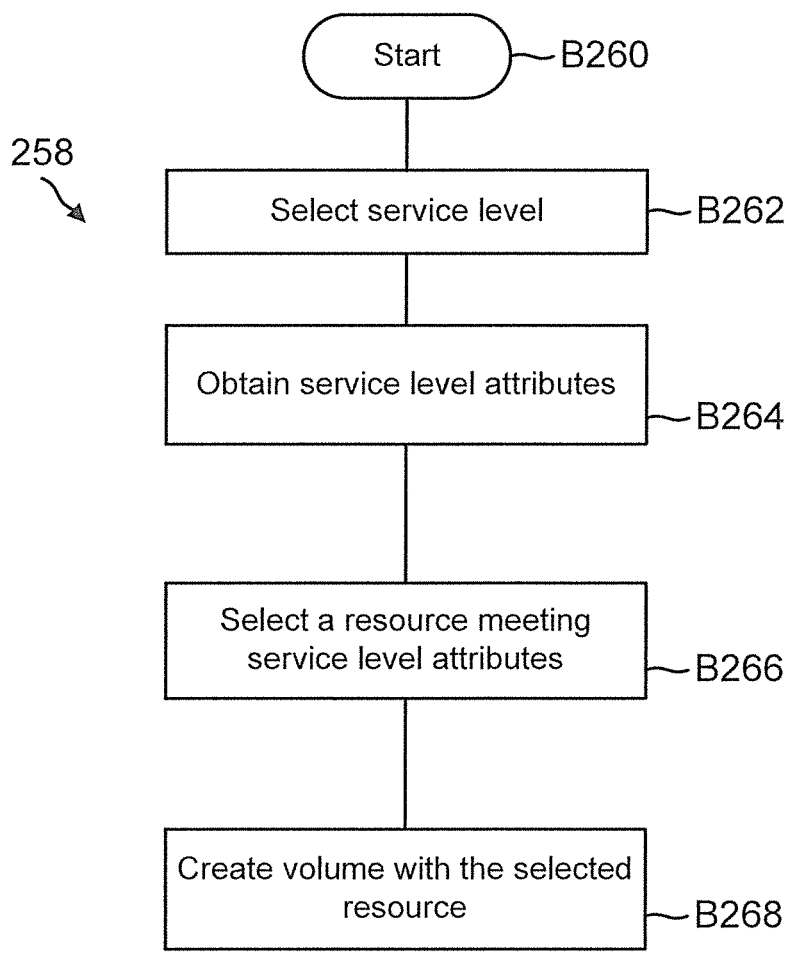
FIG. 2G shows a process for creating a volume, according to one aspect of the present disclosure.

Provisioning a Volume:

FIG. 2G shows a high-level, process 258 for provisioning a storage volume, according to one aspect of the present disclosure. The process blocks are executed by the provisioning module 140 using data structure 144. The process begins in block B260. In block B262, a service level is selected (for example, Gold). The service level may be selected via an interface that is presented by provisioning module 140. A volume name and size is obtained. A SVM may be selected which can be used to provision the volume with the expected service level.

In block B264, the service attributes for the selected service level are obtained from data structure 144. In block B266, the aggregates that can support the service attributes are searched and selected. Thereafter, in block B268, a volume for the selected aggregate is created to meet the service level.

Figure 2H:
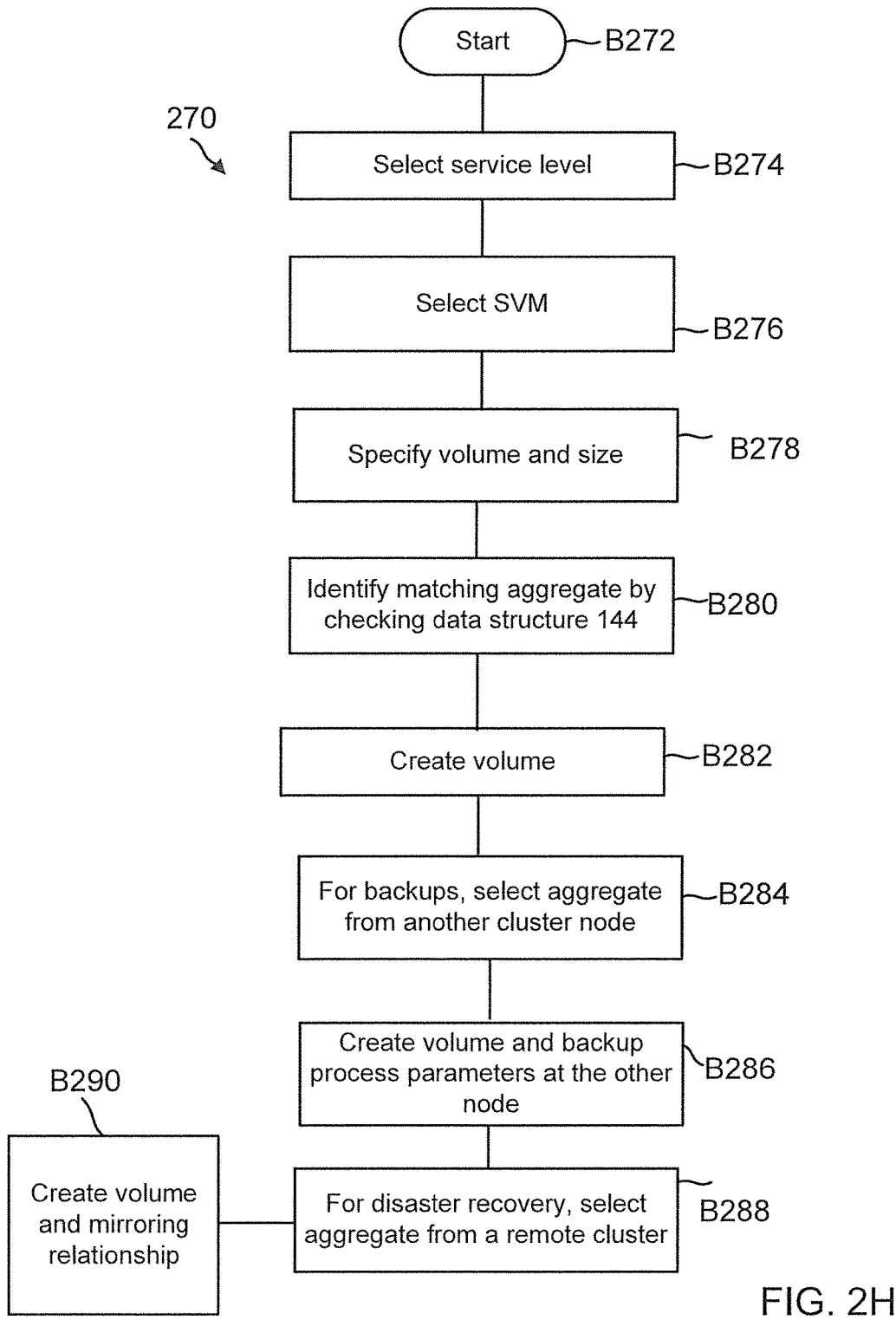
FIG. 2H shows a detailed process for creating a volume, according to one aspect of the present disclosure.

FIG. 2H shows a detailed process 270 for provisioning a storage volume for a service level, according to one aspect. The process begins in block B272, when the user is presented by a GUI by WFA server 132. A service level is selected in block B274. The service level may be a stored service level or one created by a user. In block B278, a volume name and size is specified for the service level. In block B280, an aggregate that matches the attributes of the service level is identified. This information may be stored at data structure 144 or obtained from the storage system. A volume is then created in block B282.

In block B284, a PSL level is created for the volume, based on the service level. When backups are to be taken, then, an aggregate is selected from another cluster node. In block B286, a volume for storing the backups is created at the other node.

When disaster recovery is needed, in block B288, an aggregate is selected from a remote cluster. A volume at the remote cluster is then configured for the disaster recovery in block B290. To enable storage from the source volume to the remote volume, mirroring is enabled and configured.

Figure 2I:
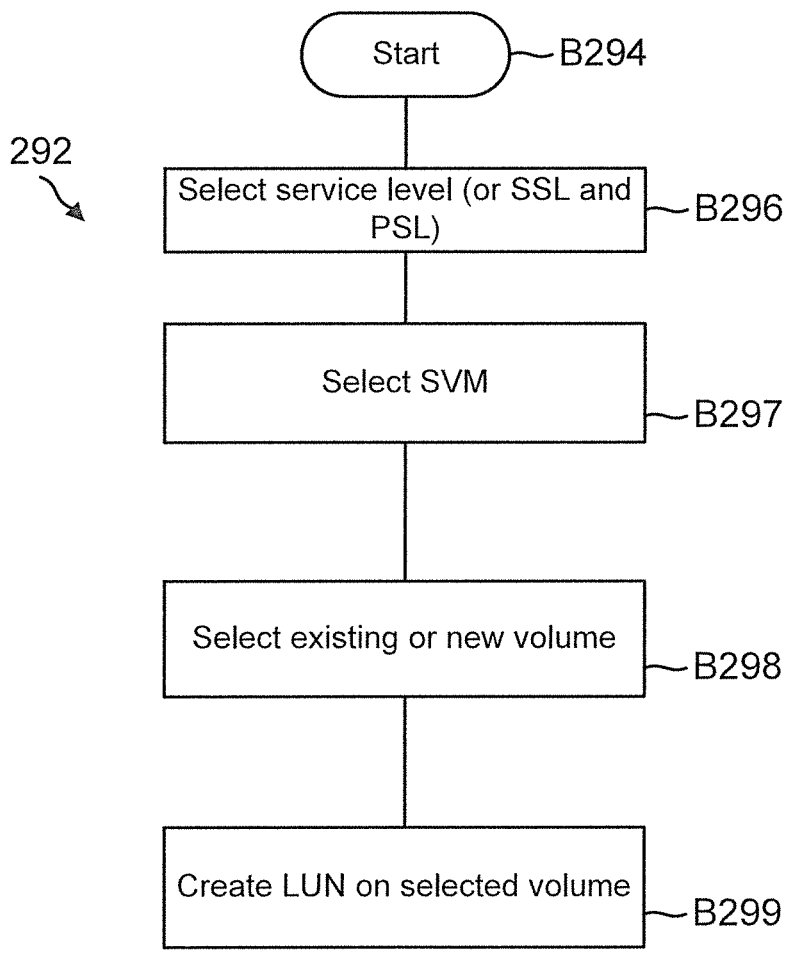
FIG. 2I shows a process for LUN provisioning, according to one aspect of the present disclosure.

Lun Provisioning:

FIG. 2I shows a process 292 for provisioning a LUN, according to one aspect of the present disclosure. The process begins in block B294, when the provisioning module 140 provides a GUI to a user. In block B296 a service level is selected. In another aspect, a SSL and/or a PSL level is selected. The SVM for the user is selected in block B297. An existing volume that can meet the service level is selected. This information may be stored at data structure 144 or obtained from the storage system. In another aspect, a new volume is provisioned for the service level, as described above with respect to FIG. 2G. In block B299, a LUN of an appropriate size is created at the selected volume.

Figure 2J:
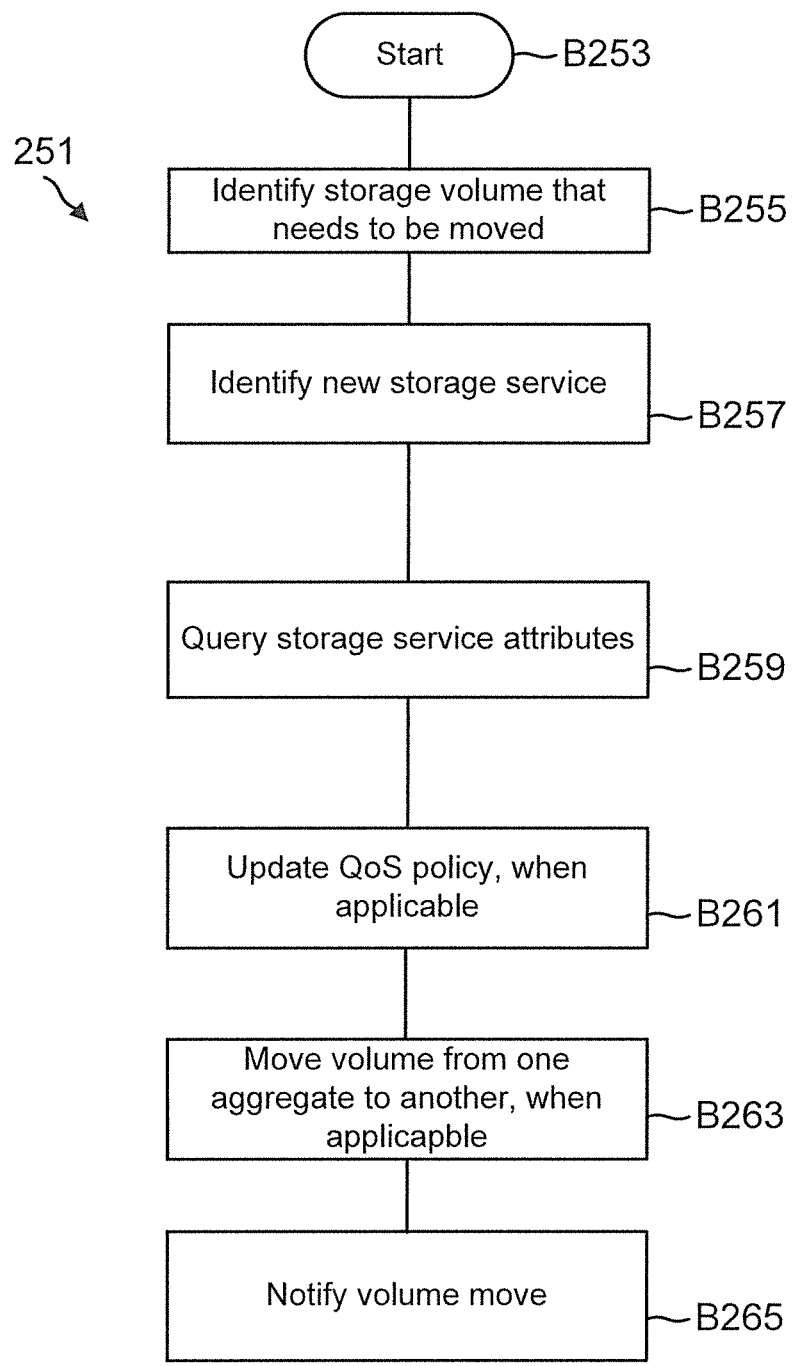
FIG. 2J shows a process for moving a volume, according to one aspect of the present disclosure.

Volume Move:

FIG. 2J shows a process 251 for moving a volume between different storage service levels. The volume may be moved to a higher service level or a lower service level. The process blocks for 251 are executed by the provisioning module 140. The process begins in block B253 and in block B255, a storage volume that needs to be moved is identified. In block B257, the new service level for the volume is identified. In block B259, the service attributes for the new service level are obtained. This may be obtained from data structure 144. In block B259, if needed, the QoS policy for the volume is changed based on the new service level. In block B263, the volume may be moved to another aggregate to meet the service level. Thereafter, in block B265, the user is notified of the volume move.

The foregoing systems and processes provide a user with efficient tools for creating different service levels without having to know the underlying storage technologies. A uniform standard is used for identifying and searching for service level attributes. The adaptive aspects also use a uniform way to search for storage resource that meet service level attributes.

Figure 3:
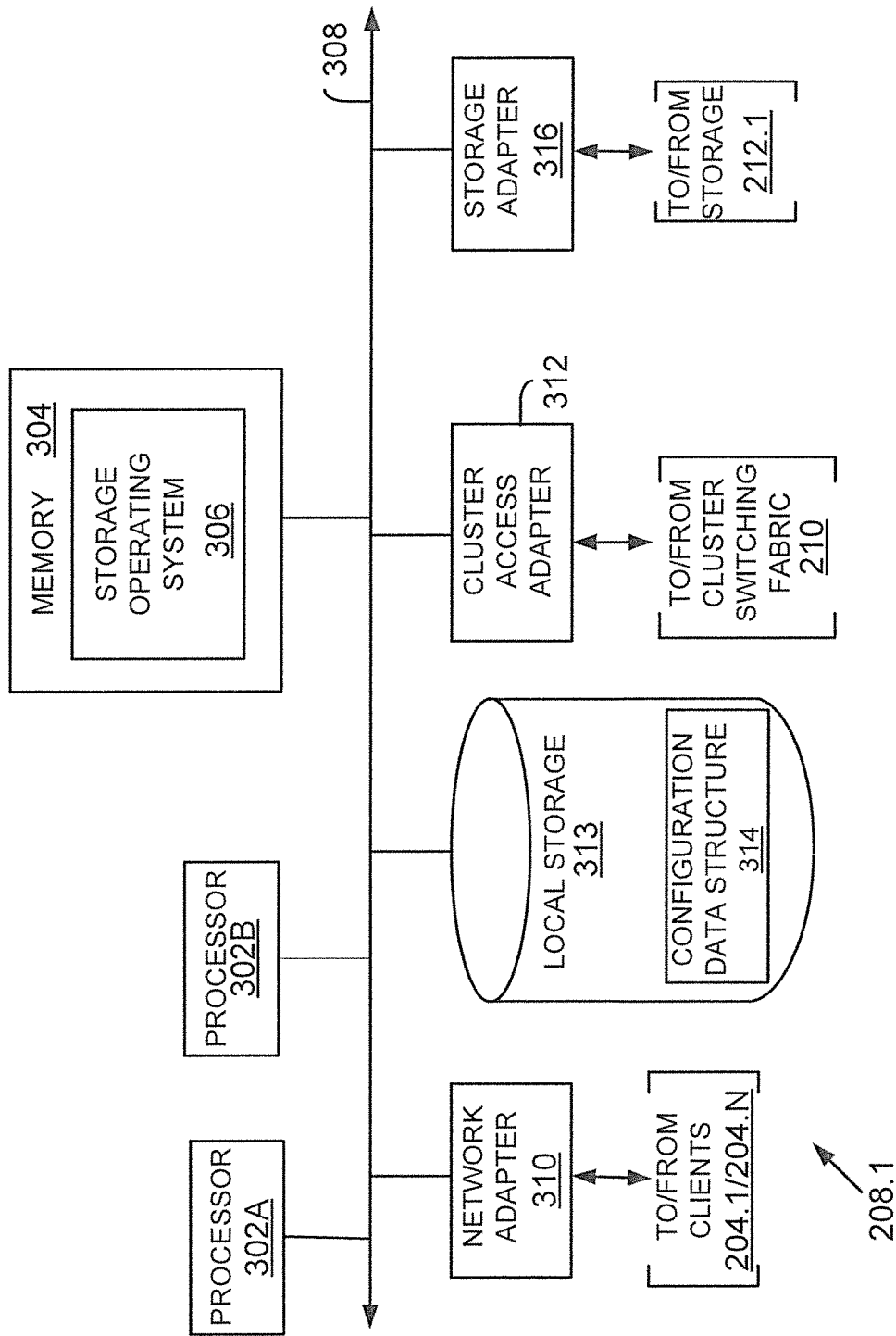
FIG. 3 shows an example of a storage system node, according to one aspect of the present disclosure.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide aggregate, volume, storage device and QoS policy information to storage system interface 141. This information is then used to populate and maintain the data structure 144 described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. The configuration information may include policy level information regarding storage volumes and their associated latency and throughput rates.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and Storage modules are implemented on separate storage systems or computers, the cluster access adapter 312 is utilized by the network/storage module for communicating with other network/storage modules in the cluster 100.

Each node 208.1 is illustratively embodied as a dual processor storage system executing a storage operating system 306 (similar to 134, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the network module 214 on the node, while the other processor 302B executes the functions of the storage module 216.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
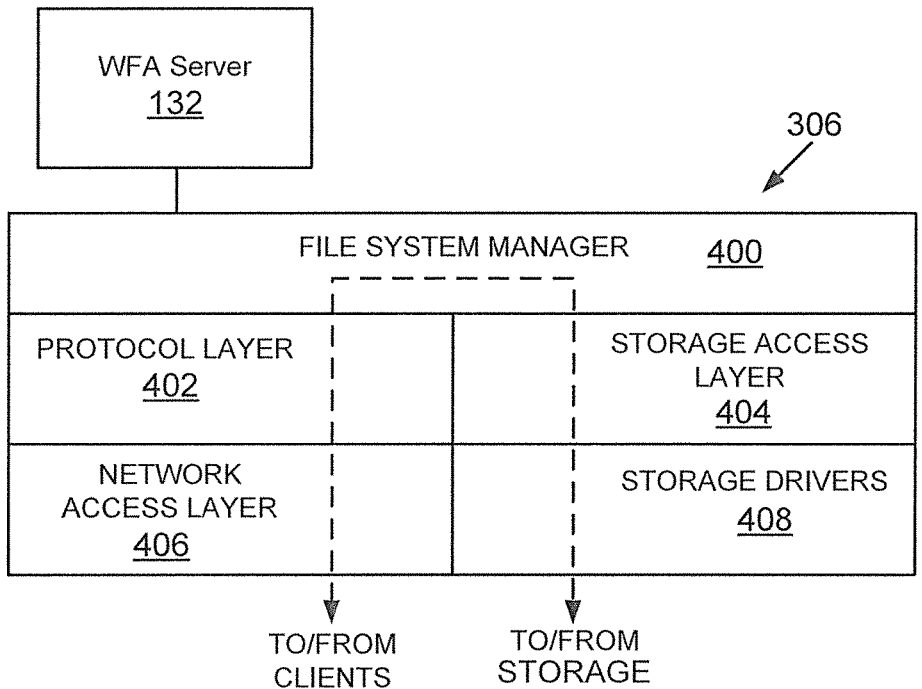
FIG. 4 shows an example of a storage operating system, used according to one aspect of the present disclosure.

Operating System:

FIG. 4 illustrates a generic example of storage operating system 306 (or 134, FIG. 1A) executed by node 208.1, according to one aspect of the present disclosure. The storage operating system 306 interfaces with WFA server 132 and provides storage resource information for data structure 144.

In one example, storage operating system 306 may include several modules, or "layers" executed by one or both of network module 214 and storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 306.

The storage operating system 306 may also include a storage access layer 404 and an associated storage driver layer 408 to allow Storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
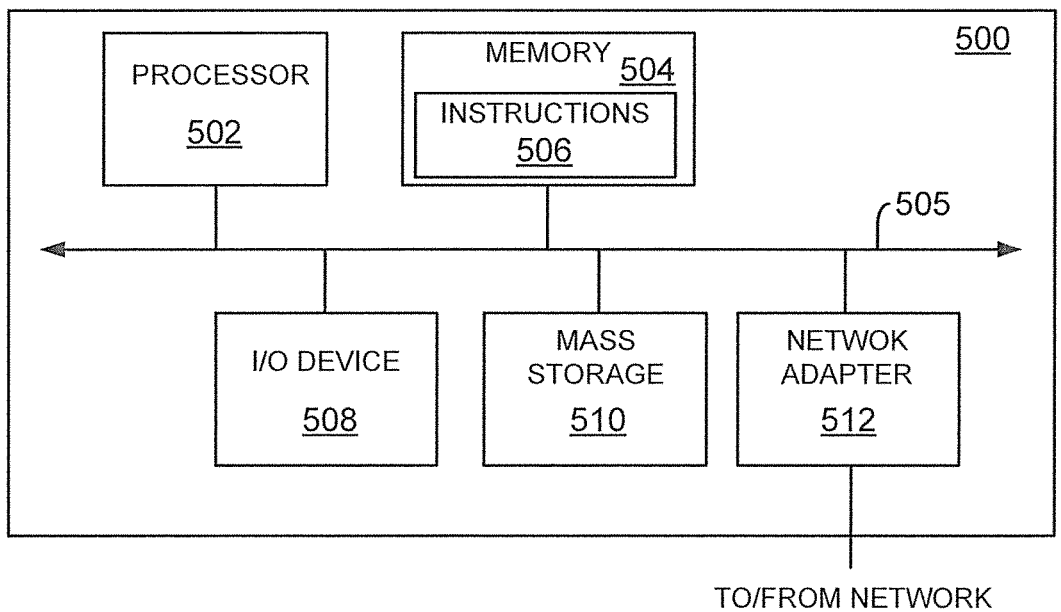
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, WFA server 132, monitoring console 128, clients 116 and 204, or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks.

The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for managing storage and protection services have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
using a storage service level (SSL) object and a protection service level (PSL) object for storing a plurality of configurable attributes by a processor, wherein a combination of the configurable attributes define service level classes (SLCs) in a networked storage system using a plurality of resources; wherein the SSL object defines storage service levels and the PSL object defines data protection service levels using one of backup and mirroring techniques; and wherein the SSL object and the PSL object use a same schema and naming convention for defining the plurality of configurable attributes regardless of configuration attribute type and resource type;
obtaining by the processor, attributes defining a second SLC for a storage volume assigned to a first SLC; and
updating by the processor, a quality of service (QOS) policy for the storage volume for using a resource that meets attributes of the second SLC; wherein the storage volume is assigned the resource; and requests for data in the networked storage system are processed using the QOS policy in compliance with the second SLC.

2. The method of claim 1, wherein a SLC includes a storage service level defined by a number of input output requests that are processed for a certain storage capacity.

3. The method of claim 1, wherein a SLC includes a storage service level defined by a minimum number of input output requests that are processed and a provisioning type for the resource.

4. The method of claim 1, wherein a SLC include a protection service level that defines a topology for protecting data for the SLC.

5. The method of claim 4, wherein the topology includes a remote cluster for storing the data for the SLC for disaster recovery.

6. The method of claim 4, wherein the topology identifies a destination storage resource within a same cluster of the networked storage environment for backing up data for the SLC.

7. The method of claim 1, wherein the same schema and the naming convention associates a service for each of the configurable attributes by identifying a storage system type, a storage system and a service name that identifies a service type for each configurable attribute.

8. A non-transitory, machine readable storage medium having stored thereon instructions comprising machine executable code which when executed by a machine, causes the machine to:
use a storage service level (SSL) object and a protection service level (PSL) object for storing a plurality of configurable attributes by a processor, wherein a combination of the configurable attributes define service level classes (SLCs) in a networked storage system using a plurality of resources; wherein the SSL object defines storage service levels and the PSL object defines data protection service levels using one of backup and mirroring techniques; and wherein the SSL object and the PSL object use a same schema and naming convention for defining the plurality of configurable attributes regardless of configuration attribute type and resource type;
obtain by the processor, attributes defining a second SLC for a storage volume assigned to a first SLC; and
update by the processor, a quality of service (QOS) policy for the storage volume for using a resource that meets attributes of the second SLC; wherein the storage volume is assigned the resource; and requests for data in the networked storage system are processed using the QOS policy in compliance with the second SLC.

9. The non-transitory storage medium of claim 8, wherein the one or more SLCs include a storage service level defined by a number of input output requests that are processed for a certain storage capacity.

10. The non-transitory storage medium of claim 8, wherein the one or more SLCs include a storage service level defined by a minimum number of input output requests that are processed for the one or more SLCs and a provisioning type for the resource.

11. The non-transitory storage medium of claim 8, wherein the one or more SLCs include a protection service level that defines a topology for protecting data for the one or more SLCs.

12. The non-transitory storage medium of claim 11, wherein the topology includes a remote cluster for storing the data for the one or more SLCs for disaster recovery.

13. The non-transitory storage medium of claim 11, wherein the topology identifies a destination storage resource within a same cluster of the networked storage environment for backing up data for the one or more SLCs.

14. The non-transitory storage medium of claim 8, wherein the same schema and the naming convention associates a service for each of the plurality of configurable attributes by identifying a storage system type, a storage system and a service name that identifies a service type for each configurable attribute.

15. A system, comprising:
a memory containing machine readable medium comprising machine executable code having stored thereon instructions; and a processor module coupled to the memory, the processor module configured to execute the machine executable code to:
use a storage service level (SSL) object and a protection service level (PSL) object for storing a plurality of configurable attributes by a processor, wherein a combination of the configurable attributes define service level classes (SLCs) in a networked storage system using a plurality of resources; wherein the SSL object defines storage service levels and the PSL object defines data protection service levels using one of backup and mirroring techniques; and wherein the SSL object and the PSL object use a same schema and naming convention for defining the plurality of configurable attributes regardless of configuration attribute type and resource type;
obtain by the processor, attributes defining a second SLC for a storage volume assigned to a first SLC; and
update by the processor, a quality of service (QOS) policy for the storage volume for using a resource that meets attributes of the second SLC; wherein the storage volume is assigned the resource; and requests for data in the networked storage system are processed using the QOS policy in compliance with the second SLC.

16. The system of claim 15, wherein the one or more SLCs include one or more of a storage service level defined by a number of input output requests that are processed for a certain storage capacity and a storage service level defined by a minimum number of input output requests that are processed for the one or more SLCs and a provisioning type for the resource.

17. The system of claim 15, wherein the one or more SLCs include a protection service level that defines a topology for protecting data for the one or more SLCs.

18. The system of claim 15, wherein the topology includes a remote cluster for storing the data for the one or more SLCs for disaster recovery.

19. The system of claim 15, wherein the topology identifies a destination storage resource within a same cluster of the networked storage environment for backing up data for the one or more SLCs.

20. The system of claim 15, wherein the same schema and the naming convention associates a service for each of the plurality of configurable attributes by identifying a storage system type, a storage system and a service name that identifies a service type for each configurable attribute.

* * * * *